US011037317B2

(12) United States Patent
Cheng et al.

(10) Patent No.: US 11,037,317 B2
(45) Date of Patent: Jun. 15, 2021

(54) TOOTH-POSITION RECOGNITION SYSTEM

(71) Applicant: Quanta Computer Inc., Taoyuan (TW)

(72) Inventors: Kai-Ju Cheng, Taoyuan (TW);
Kuan-Chung Chen, Taoyuan (TW);
Yu-Cheng Chien, Taoyuan (TW);
Chung-Sheng Wu, Taoyuan (TW);
Hao-Ping Lee, Taoyuan (TW);
Chin-Yuan Ting, Taoyuan (TW);
Yu-Hsun Chen, Taoyuan (TW);
Shao-Ang Chen, Taoyuan (TW);
Jia-Chyi Wang, Taoyuan (TW);
Chih-Wei Sung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 29 days.

(21) Appl. No.: 16/707,234

(22) Filed: Dec. 9, 2019

(65) Prior Publication Data
US 2021/0074011 A1 Mar. 11, 2021

(30) Foreign Application Priority Data
Sep. 6, 2019 (TW) .................. 108132140

(51) Int. Cl.
*G06T 7/593* (2017.01)
*G06T 7/00* (2017.01)
*G06T 7/73* (2017.01)

(52) U.S. Cl.
CPC ............... *G06T 7/593* (2017.01); *G06T 7/73* (2017.01); *G06T 7/97* (2017.01); *G06T 2207/20081* (2013.01); *G06T 2207/30036* (2013.01)

(58) Field of Classification Search
CPC .. G06T 7/593; G06T 7/97; G06T 7/73; G06T 2207/20081; G06T 2207/30036
See application file for complete search history.

(56) References Cited

U.S. PATENT DOCUMENTS 8,255,948 B1* 8/2012 Black .................. H04N 21/252
725/35
10,916,053 B1* 2/2021 Katzman ................ A61C 7/002
(Continued)

OTHER PUBLICATIONS

Zhang, Kailai, et al. "An effective teeth recognition method using label tree with cascade network structure." Computerized Medical Imaging and Graphics 68 (2018): 61-70. (Year: 2018).*

*Primary Examiner* — Bobbak Safaipour
(74) *Attorney, Agent, or Firm* — McClure, Qualey & Rodack, LLP

(57) ABSTRACT

A tooth-position recognition system includes an electronic device and a calculation device. The electronic device includes a first camera. The first camera is configured to capture a plurality of tooth images. The calculation device includes a second camera and a processor. The second camera is configured to capture a user image. The processor is configured to receive the tooth images, compare the corresponding position of each pixel in each tooth image to generate a depth map, and input the tooth images, the depth map, and a plurality of first tooth-region identifiers into a tooth deep-learning model. The tooth deep-learning model outputs a plurality of deep-learning probability values that are the same in number as the first tooth-region identifiers. The processor inputs the user image and the plurality of second tooth-region identifiers into a user-image deep-learning model.

10 Claims, 14 Drawing Sheets

(56) References Cited

U.S. PATENT DOCUMENTS

| | | | |
|---|---|---|---|
| 2016/0199215 A1* | 7/2016 | Kopelman | A61F 5/566 128/848 |
| 2018/0204111 A1* | 7/2018 | Zadeh | G06K 9/3233 |
| 2019/0180443 A1* | 6/2019 | Xue | G06K 9/66 |
| 2020/0184278 A1* | 6/2020 | Zadeh | G06F 16/953 |

* cited by examiner

| permanent teeth | | | | | | | | | | | | | | | |
|---|---|---|---|---|---|---|---|---|---|---|---|---|---|---|---|
| upper right | | | | | | | | upper left | | | | | | | |
| 18 | 17 | 16 | 15 | 14 | 13 | 12 | 11 | 21 | 22 | 23 | 24 | 25 | 26 | 27 | 28 |
| 48 | 47 | 46 | 45 | 44 | 43 | 42 | 41 | 31 | 32 | 33 | 34 | 35 | 36 | 37 | 38 |
| lower right | | | | | | | | lower left | | | | | | | |

| deciduous teeth | | | | | | | | | |
|---|---|---|---|---|---|---|---|---|---|
| upper right | | | | | upper left | | | | |
|  |  | 55 | 54 | 53 | 52 | 51 | 61 | 62 | 63 | 64 | 65 |  |  |
|  |  | 85 | 84 | 83 | 82 | 81 | 71 | 72 | 73 | 74 | 75 |  |  |
| lower right | | | | | lower left | | | | |

TOOTH-POSITION RECOGNITION SYSTEM

CROSS REFERENCE TO RELATED APPLICATIONS

This application claims priority of Taiwan Patent Application No. 108132140, filed on Sep. 6, 2019, the entirety of which is incorporated by reference herein.

BACKGROUND OF THE INVENTION

Field of the Invention

The present disclosure relates to a recognition system and, in particular, to a system that recognizes the position of a tooth.

Description of the Related Art

Traditionally, dentists need to place a dental mirror into the patient's oral cavity in order to be able to see the innermost parts of the patient's oral cavity. However, even if a smart dental mirror is equipped with a lens, only parts of the teeth can be photographed due to the view offered by the lens being limited. Moreover, human teeth on the left side are close to symmetrical with those on the right. Therefore, it is difficult for the common people to accurately determining the position of dental mirror corresponding to the actual tooth position. A dentist's experience is also needed to determine which tooth the dental mirror is currently placed on.

Therefore, how to automatically and accurately identify the actual tooth position captured by the smart dental mirror is still one of the problems that needs to be solved in this field.

BRIEF SUMMARY OF THE INVENTION

In order to solve the above problems, the present disclosure provides a tooth-position recognition system. The tooth-position recognition system includes an electronic device and a calculation device. The electronic device includes a first camera. The first camera is configured to capture a plurality of tooth images. The calculation device includes a second camera and a processor. The second camera is configured to capture a user image. The processor is configured to receive the tooth images, compare the corresponding position of each pixel in each tooth image to generate a depth map, and input the tooth images, the depth map, and a plurality of first tooth-region identifiers into a tooth deep-learning model. The tooth deep-learning model outputs a plurality of deep-learning probability values that are the same in number as the first tooth-region identifiers. The processor inputs the user image and the plurality of second tooth-region identifiers into a user-image deep-learning model, which outputs a left region probability value and a right region probability value. The processor treats the deep-learning probability values, the left regional probability value, and the right regional probability value as a plurality of feature values, and inputs the feature values and a plurality of third tooth-region identifiers into a multi-layer perceptron classifier, which outputs a tooth-position probability that corresponds to the tooth images.

In accordance with one feature of the present invention, the present disclosure provides a tooth-position recognition system. The tooth-position recognition system includes an electronic device and a calculation device. The electronic device includes a first camera and an inertial measurement unit (IMU). The first camera is configured to capture a plurality of tooth images. The inertial measurement unit is configured to measure the posture information and the motion track of the electronic device. The calculation device includes a processor. The processor is configured to receive the tooth images, compare the corresponding position of each pixel in each tooth image to generate a depth map, and input the tooth images, the depth map, and a plurality of first tooth-region identifiers into a tooth deep-learning model. The tooth deep-learning model outputs a plurality of deep-learning probability values that are the same in number as the first tooth-region identifiers. The processor inputs the user image and the plurality of second tooth-region identifiers into an IMU-movement deep-learning model, which outputs a plurality of quadrant probability values. The processor treats the deep-learning probability values and the quadrant probability values as feature values, and inputs the feature values and a plurality third tooth-region identifiers into the multi-layer perceptron classifier, and the multi-layer perceptron classifier outputs a tooth-position probability corresponding to the tooth images.

The tooth-position recognition system applies tooth-region identifiers and a tooth deep-learning model to achieve the effect of automatically and accurately determining the tooth image corresponding to the actual tooth position.

BRIEF DESCRIPTION OF THE DRAWINGS

In order to describe the manner in which the above-recited and other advantages and features of the disclosure can be obtained, a more particular description of the principles briefly described above will be rendered with reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which:

FIGS. 3A-3B are schematic diagrams of a tooth area indicating position in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
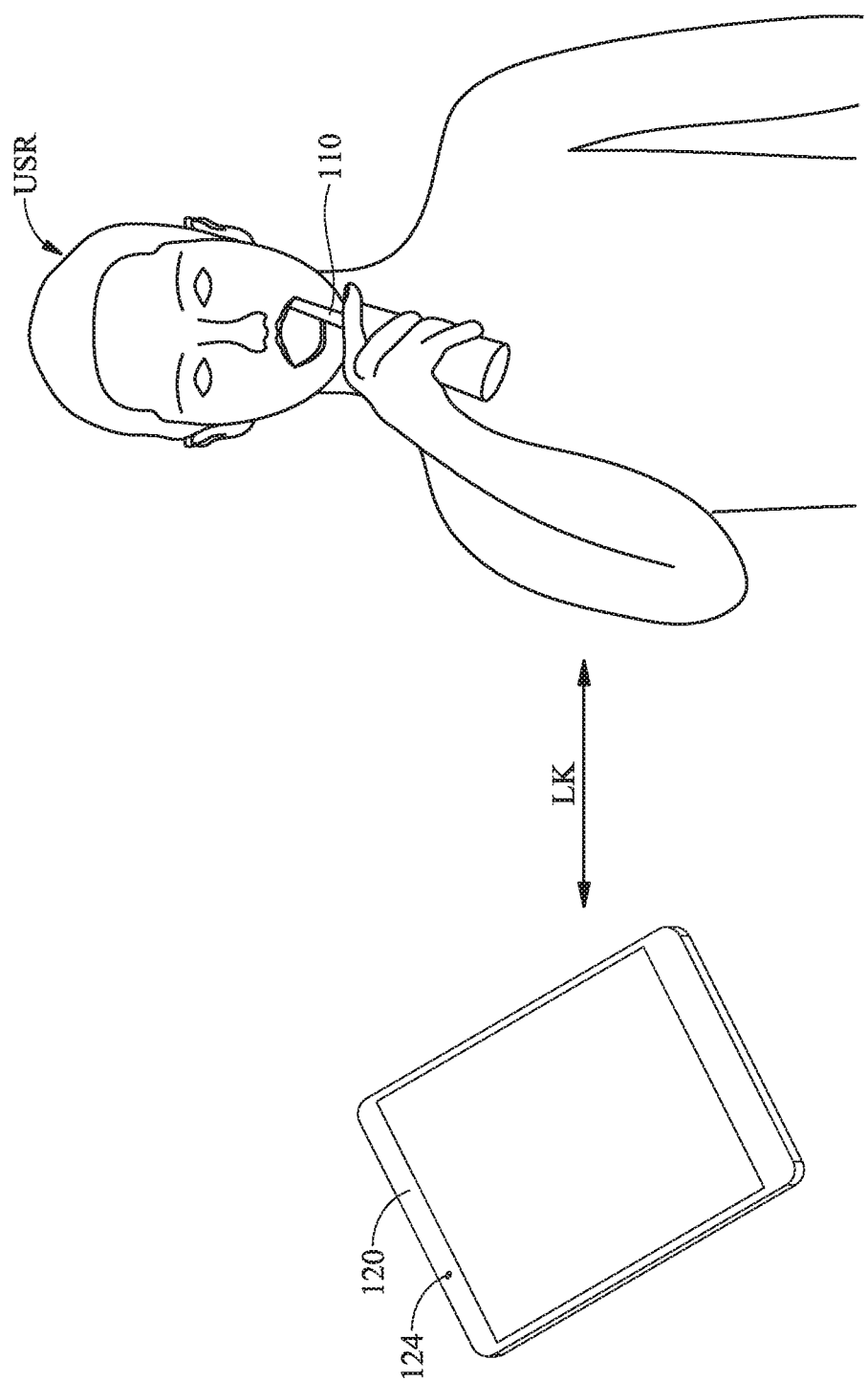
FIG. 1A is a schematic diagram of a tooth-position recognition system in accordance with one embodiment of the present disclosure.
Figure 1B:
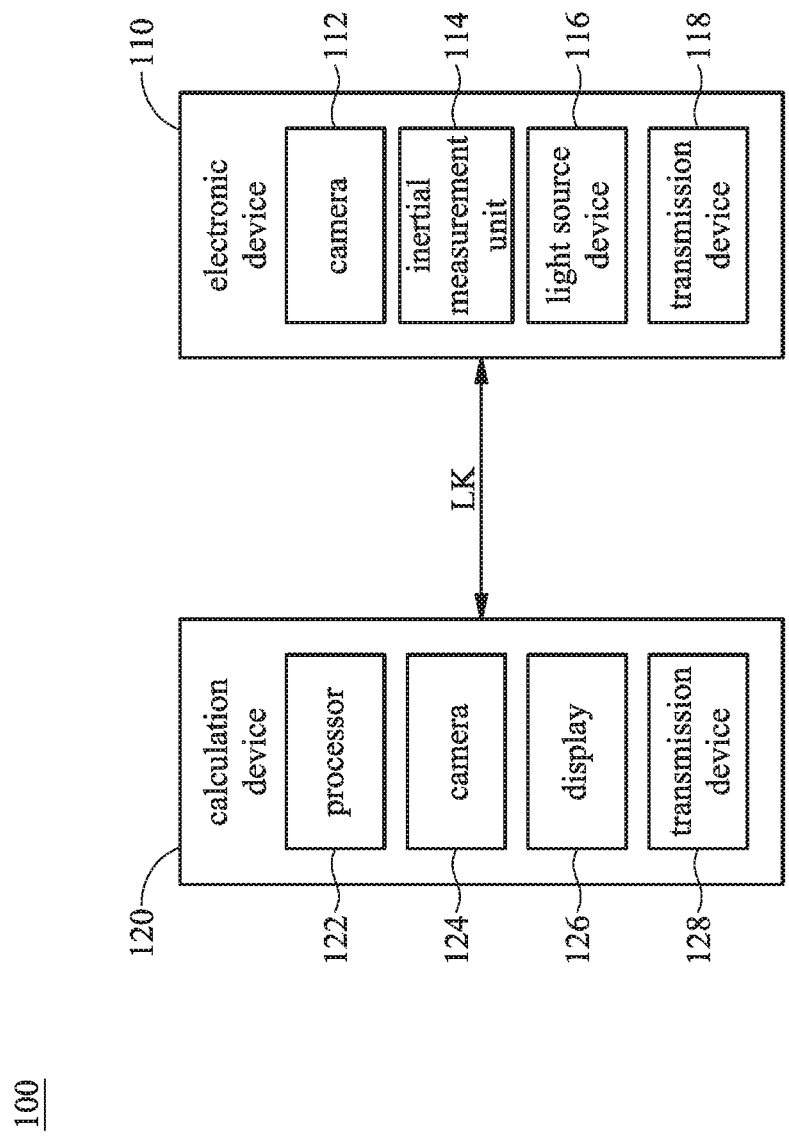
FIG. 1B is a block diagram of a tooth-position recognition system 100 in accordance with one embodiment of the present disclosure.

Referring to FIG. 1A to FIG. 1B together, FIG. 1A is a schematic diagram of a tooth-position recognition system in accordance with one embodiment of the present disclosure. FIG. 1B is a block diagram of a tooth-position recognition system 100 in accordance with one embodiment of the present disclosure. In one embodiment, the electronic device 110 (for example, a digital dental mirror or another device that can be used to capture the inside of the oral cavity; the following is exemplified by a digital dental mirror) includes a camera 112 and an inertial measurement unit (IMU) 114. In one embodiment, the digital dental mirror 110 further includes a light source device 116 and a transmission device 118. In one embodiment, when the user USR places the digital dental mirror 110 into the oral cavity, the light source device 116 is used to provide a light source, and the camera 112 captures a portion of the teeth in the oral cavity to capture multiple tooth images.

In one embodiment, the camera 112 is composed of at least one Charge Coupled Device (CCD) or a Complementary Metal-Oxide Semiconductor (CMOS) sensor.

In one embodiment, the inertial measurement unit 114 is a device that measures the triaxial attitude angle (or angular rate) of the object as well as the acceleration. The inertial measurement unit 114 may include a three-axis gyroscope and three-direction accelerometers to measure the angular velocity and acceleration of the object in three-dimensional space, and calculate the movement information of the object according to the sensed angular velocity and acceleration. For example, when the user USR puts the digital dental mirror 110 into the oral cavity, the inertial measurement unit 114 is configured to measure the posture information (e.g., the inertial measurement unit 114 measures the user's gesture) and the motion track of the digital tooth mirror 110.

In one embodiment, the light source device 116 can be a device including a semiconductor in a light emitting diode.

In one embodiment, a communication link LK may be established between the transmission devices 118, 128 by wire or wirelessly. The transmission devices 118, 128 may be Bluetooth devices, wireless network cards, or other devices with communication functions.

In one embodiment, the transmission device 118 transmits the plurality of tooth images captured by the camera 112 to the calculation device 120 via the communication link LK. In one embodiment, the calculation device 120 includes a processor 122. In one embodiment, the calculation device 120 further includes a camera 124. In one embodiment, the calculation device 120 further includes a display 126 and a transmission device 128.

In one embodiment, the calculation device 120 can be a mobile phone, a tablet, a notebook computer, a desktop computer, or another computing device.

In one embodiment, the processor 122 can be implemented by an integrated circuit such as a micro controller, a microprocessor, a digital signal processor, an application specific integrated circuit (ASIC), or a logic circuit.

In one embodiment, the display 126 is configured to display the tooth images from the camera 112 received by the calculation device 120.

Figure 2:
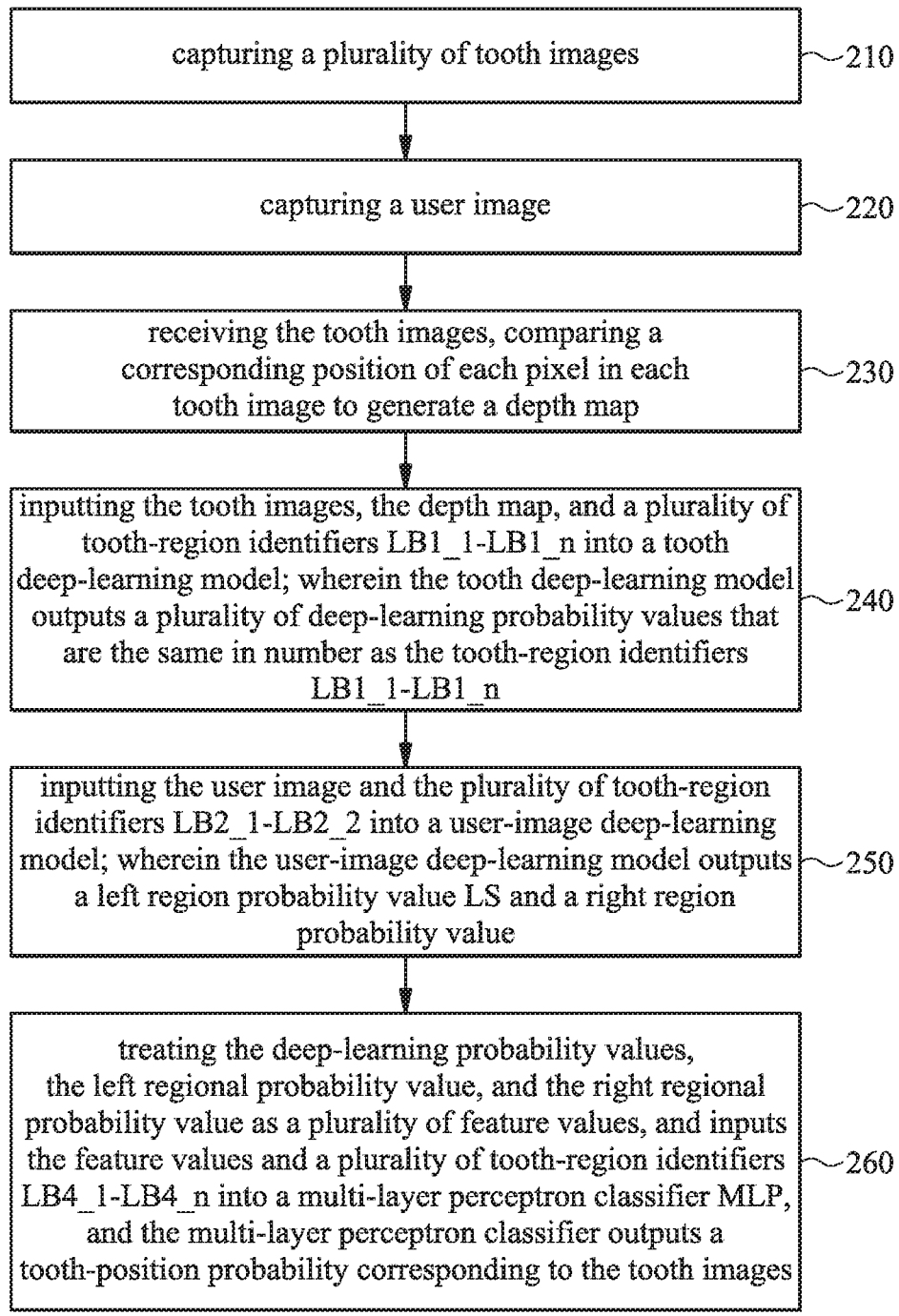
FIG. 2 is a flowchart of a tooth's position recognition method 200 in accordance with one embodiment of the present disclosure.

FIG. 2 is a flowchart of a tooth's position recognition method 200 in accordance with one embodiment of the present disclosure.

In step 210, the camera 112 captures a plurality of tooth images.

Figure 3A:
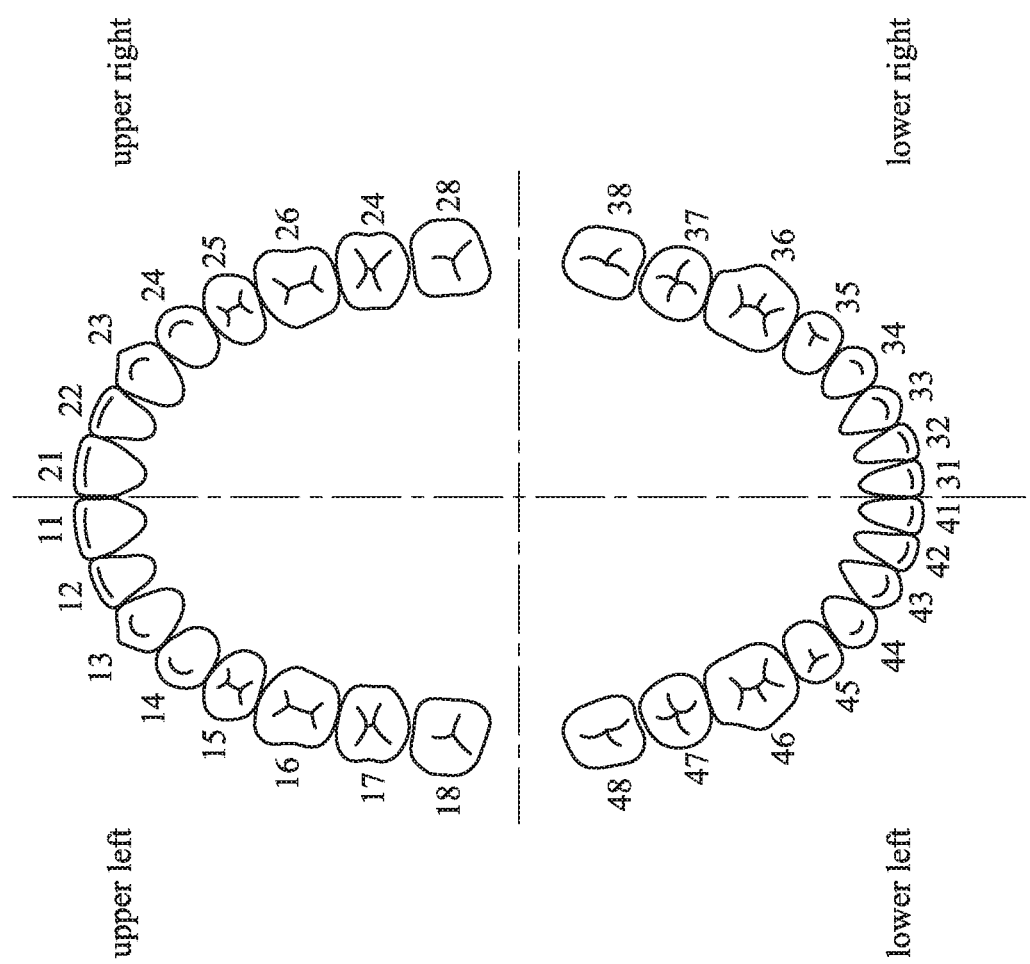

Please refer to FIGS. 3A-3B, FIGS. 3A-3B are schematic diagrams of a tooth area indicating position in accordance with one embodiment of the present disclosure. FIGS. 3A-3B are the representations of the teeth proposed by the Federation Dentaire Internationale (FDI), which are universal, also known as the ISO-3950 notation. Each tooth is represented by two Arabic numerals, the first one of the two Arabic numerals representing the quadrant in which the tooth is located. The upper right, upper left, lower left, and lower right of the tooth position of FIG. 3A are 1, 2, 3, and 4 in the permanent teeth, and 5, 6, 7, and 8 in the deciduous teeth. The second one of the two Arabic numerals indicates the positions of the tooth: from the middle incisor to the third molar are 1~8, and the corresponding table can also be shown in FIG. 3B. In general, there are about 32 permanent teeth in an adult. For example, the camera 112 may perform multiple shots on a specific at least one tooth (for example, 1 teeth or 2 tooth) in an adult's mouth to obtain multiple tooth images. According to the subsequent steps, the positions of the tooth images corresponding to the FIGS. 3A-3B are identified.

In step 220, the camera 124 captures a user image.

In one embodiment, the camera 124 is the front lens (selfie lens) of calculation device 120. When the digital tooth mirror 110 is placed in the user's USR mouth, the user USR or another person holding the calculation device 120 takes the user's image by the camera 124. In one embodiment, the user USR can use the camera 124 to self-photograph the scenario of using the digital tooth mirror 110 to obtain the user image.

In step 230, the processor 122 receives the tooth images, compares a corresponding position of each pixel in each tooth image to generate a depth map DP. For example, the processor 122 can generate a depth map DP by using a known algorithm, such as Monocular algorithm, Binocular algorithm by receiving a plurality of tooth images.

Figure 4:
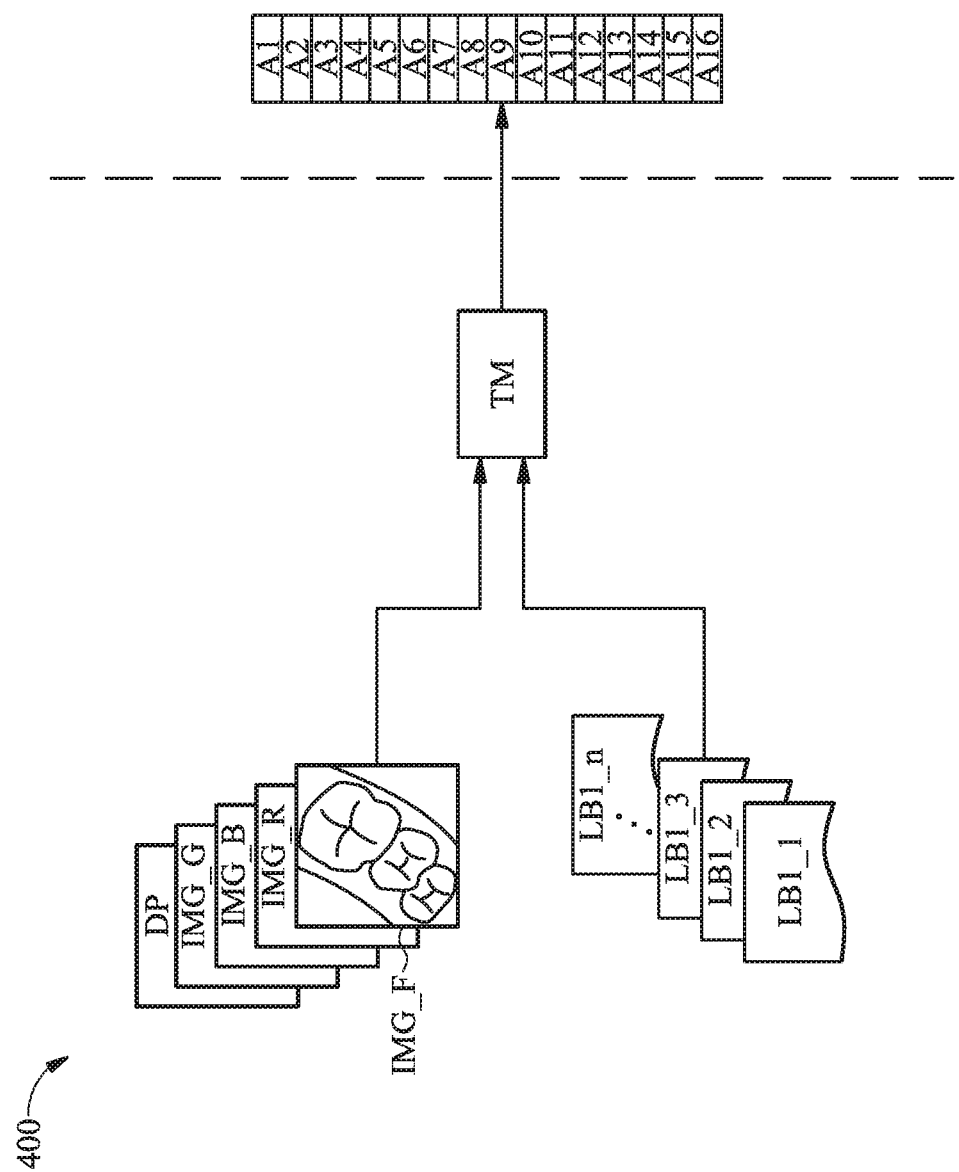
FIG. 4 is a schematic diagram of a method for applying a tooth deep-learning model to obtain a deep-learning probability value in accordance with one embodiment of the present disclosure.

Please refer to FIG. 4, which is a schematic diagram of a method 400 for applying a tooth deep-learning model TM to obtain a deep-learning probability value in accordance with one embodiment of the present disclosure.

In step 240, the processor 122 inputs the tooth images, the depth map, and a plurality of tooth-region identifiers LB1_1-LB1_n into a tooth deep-learning model TM. The tooth deep-learning model TM outputs a plurality of deep-learning probability values A1-A16 that are the same in number as the tooth-region identifiers LB1_1-LB1_n.

In one embodiment, the tooth images include an original image IMG_F, an R channel array image IMG_R, a G channel array image IMG_G, a B channel array image IMG_B, and/or a depth map DP. In one embodiment, the tooth images may include a plurality of sets at different view angles of the original images IMG_F, the R channel array images IMG_R, the G channel array images IMG_G, the B channel array images IMG_B, and/or the depth maps DP.

The plurality of tooth-region identifiers LB1_1-LB1_n include, for example, the right half of all the teeth (upper right and lower right), that is, the serial number of detail region of these 16 teeth. For example, the tooth positions 21 to 28 and 31 to 38 in the tooth representation shown in FIGS. 3A to 3B are marked with numbers. The processor 122 defines the tooth area identifiers LB1_1-LB1_n for each of the tooth positions 21~28 and 31~38. For example, tooth position 21 is defined as the tooth area identifier LB1_1, the position of tooth position 22 is defined as the tooth area identifier LB1_2 . . . , and the tooth position 38 is defined as the tooth area identifier LB1_16 (in this example, n is 16). This is only an example, and the corresponding manner can be adjusted according to the actual implementation of the tooth-position recognition system 100.

In some embodiments, the plurality of tooth-region identifiers LB1_1~LB1_n may also be used for defining a top view region, a left and right side region, and/or a front and rear region of one or more teeth.

The processor 122 inputs the original image IMG_F, the R channel array image IMG_R, the G channel array image IMG_G, the B channel array image IMG_B and/or the depth map DP and the plurality of tooth-region identifiers LB1_1~LB1_n into a tooth deep-learning model TM. The tooth deep-learning model TM outputs a plurality of deep-learning probability values A1 to A16 that are the same as the number (for example, 16) of tooth-region identifiers LB1_1 to LB1_n. In other words, the number of deep-learning probability values A1 to A16 corresponds to the tooth area identifiers LB1_1-LB1_n with the same number 16.

In one embodiment, each of the tooth-region identifiers LB1_1-LB1_n corresponds to a deep-learning probability value A1 to A16. For example, the position of the tooth number 21 corresponds to the deep-learning probability value A1, the position of the tooth number 22 corresponds to the deep-learning probability value A2, and the position of the tooth number 23 corresponds to the deep-learning probability value A3. This is only an example, and the corresponding manner can be adjusted according to the actual implementation of the tooth-position recognition system 100.

In one embodiment, the deep-learning probability value A1 output by the tooth deep-learning model TM is, for example, 90%, the deep-learning probability value A2 is, for example, 30%, and the deep-learning probability value A3 is, for example, 10%. If the value of the deep-learning probability value A1 is the highest among all the deep-learning probability values A1 to A16, the tooth-region identifiers LB1_1 (e.g., the position of tooth number 21) corresponding to the deep-learning probability value A1 is the highest.

Figure 5:
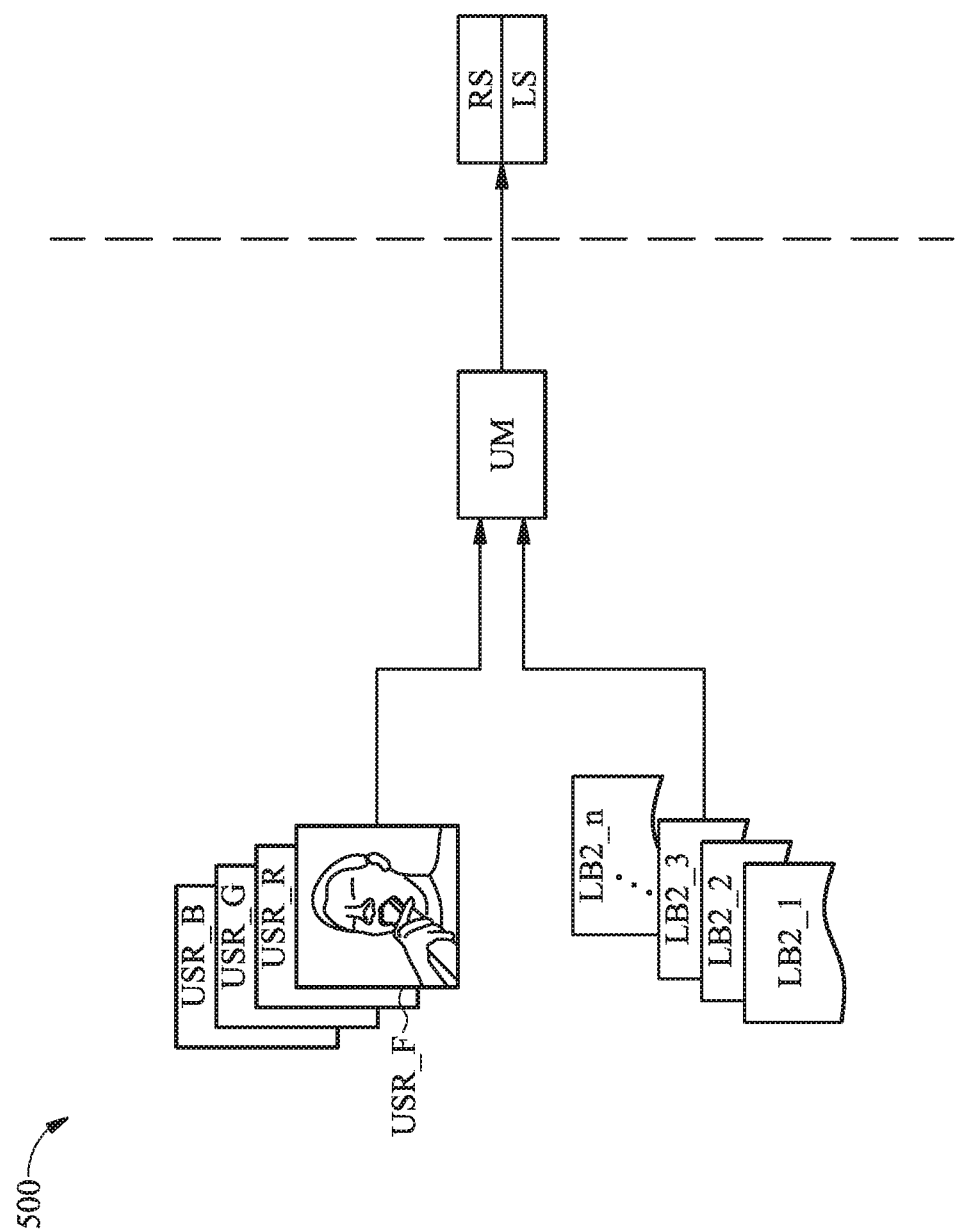
FIG. 5 is a schematic diagram of a method of applying user-image deep-learning model to obtain left region probability value and right region probability value in accordance with one embodiment of the present disclosure.

Please refer to FIG. 5, which is a schematic diagram of a method 500 of applying user-image deep-learning model UM to obtain left region probability value LS and right region probability value RS in accordance with one embodiment of the present disclosure.

In step 250, the processor 122 inputs the user image and the plurality of tooth-region identifiers LB2_1-LB2_2 into a user-image deep-learning model UM, the user-image deep-learning model UM outputs a left region probability value LS and a right region probability value RS.

In one embodiment, the tooth-region identifiers LB2_1-LB2_n are, for example, two regions (in this example, n is 2). For example, the right half of all the teeth (upper right and lower right) is marked by tooth-region identifier LB2_1, and the left half (top left and bottom left) of all the tooth is marked by the tooth-region identifier LB2_n. This is only an example, and the corresponding manner can be adjusted according to the actual implementation of the tooth's position recognition 100.

In other words, the number of probability values (left regional probability value LS and right regional probability value LS) output by the user-image deep-learning model UM in FIG. 5 corresponds to the tooth-region identifiers LB2_1 to LB2_n, and the number of regions is also 2.

In one embodiment, there may be multiple user images, and the user images may include the original image USR_F, the R channel array image USR_R, the G channel array image USR_G, and/or the B channel array image USR_B. In one embodiment, the user images may include a plurality of sets at different view angles of the original image USR_F, the R channel array image USR_R, the G channel array image USR_G, and/or the B channel array image USR_B.

The processor 122 inputs the original image USR_F, the R channel array image USR_R, the G channel array image USR_G, and/or the B channel array image USR_B into the user-image deep-learning model UM, and the user-image deep-learning model UM outputs the left region probability value LS and the right area probability value RS.

In one embodiment, when the left region probability value LS is greater than the right region probability value RS, the user USR has a higher probability of using the digital tooth mirror 110 to capture the left half of all teeth. When the right region probability value RS is greater than the left region probability value LS, the user USR has a higher probability of using the digital tooth mirror 110 to capture the right half of all teeth.

In one embodiment, the tooth deep-learning model and the user-image deep-learning model are each implemented by a convolutional neural network (CNN) model.

Figure 6:
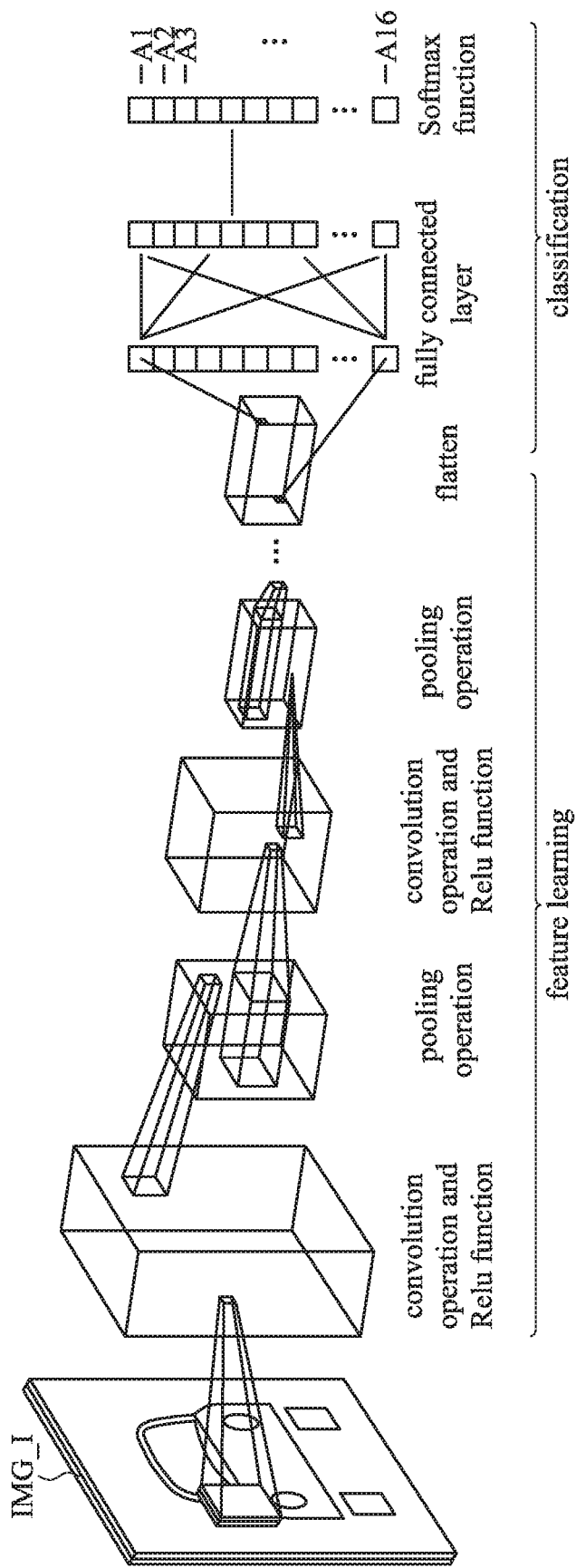
FIG. 6 is a schematic diagram of a CNN model in accordance with one embodiment of the present disclosure.

Please refer to FIG. 6, which is a schematic diagram of a CNN model in accordance with one embodiment of the present disclosure. The CNN model is to substitute at least one original image IMG_I (e.g., the original image IMG_F, the R channel array image IMG_R, the G channel array image IMG_G, the B channel array image IMG_B and/or the depth map DP) into convolution operation, use the Relu function to remove negative values, and more to extract the shape of the object, then perform pooling operation. Here, the convolution operation, the Relu function operation, and the pooling operation can be a set of operations, and the set of operations can be repeated many times, such as repeating the process of the feature learning stage in FIG. 6 twice. In other words, after the original image IMG_I is input, it will go through two convolution layers and then flatten it and then enter the fully connected layer. Finally, the Softmax function is converted to probability to classify the results (for example, the deep-learning probability values A1 to A16 or the left regional probability value LS and the right regional probability value RS). However, persons with ordinary skill in the art will appreciate that the present invention is not limited to the use of the CNN model, as long as other neural network models that can achieve automatic classification are also applicable. The Softmax function is the gradient logarithm normalization of the finite item discrete probability distribution, which is a known algorithm, so it will not be more described here.

Figure 7:
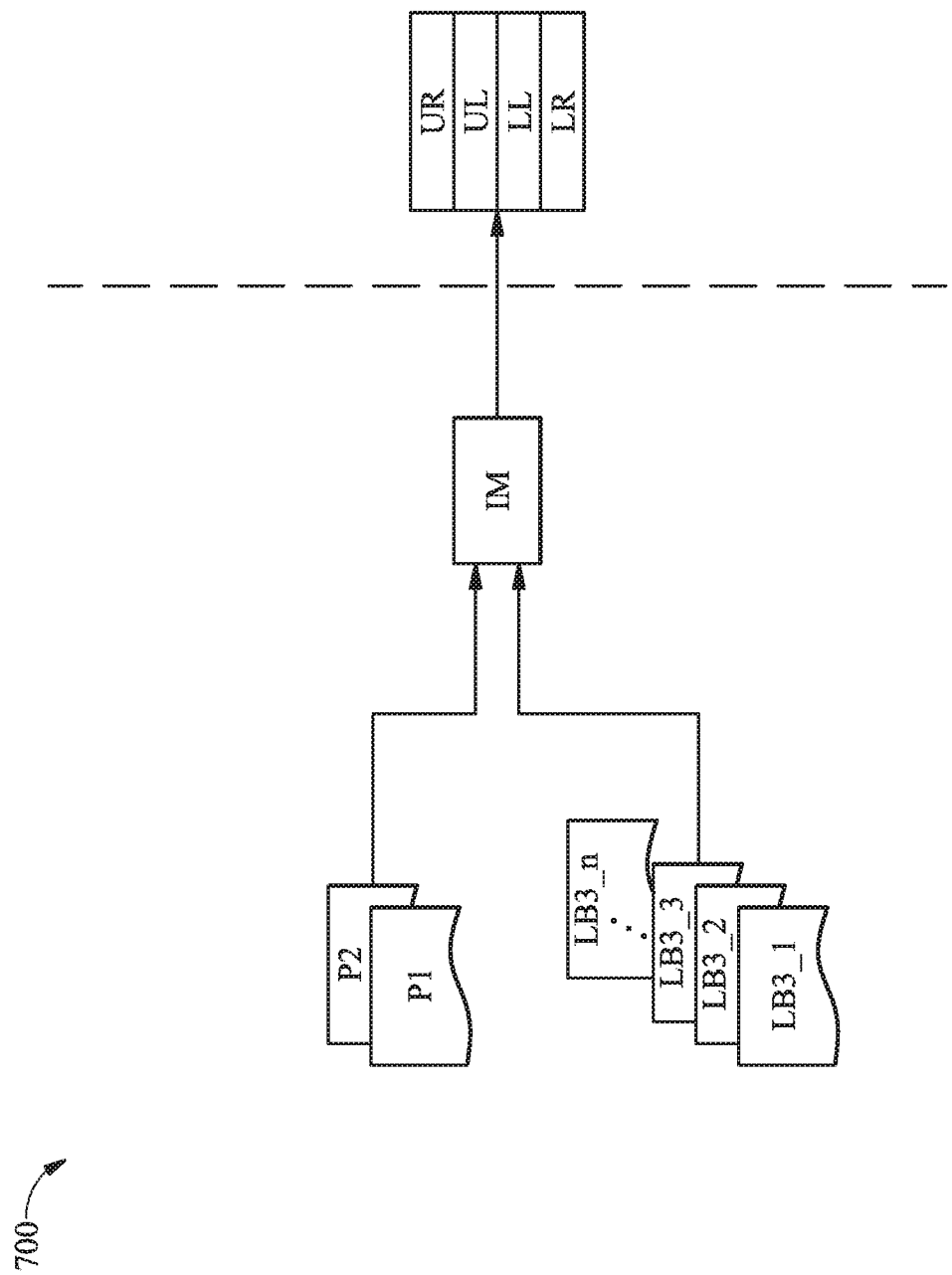
FIG. 7 is a schematic diagram of a method for obtaining quadrant probability values by applying an IMU-movement deep-learning model in accordance with one embodiment of the present disclosure.

Please refer to FIG. 7, which is a schematic diagram of a method 700 for obtaining quadrant probability values UR, UL, LL, and LR by applying an IMU-movement deep-learning model IM in accordance with one embodiment of the present disclosure.

In an embodiment, the inertial measurement unit (IMU) 114 is configured to measure the posture information P1 and the motion track P2 of the digital dental mirror 110. The processor 122 inputs the posture information P1, the motion track P2, and the plurality of tooth-region identifiers LB3_1-LB3_4 into an IMU motion deep learning model IM. The IMU motion deep learning model IM outputs a plurality of quadrant probability values UR, UL, LL, and/or LR. The plurality of tooth-region identifiers LB3_1-LB3_4 are shown in FIG. 3A, and all the tooth positions are divided into four quadrants (the upper right side is the first quadrant tooth-region identifier LB3_1, the upper left side is the second quadrant tooth-region identifier LB3_2, the lower left is the third quadrant tooth-region identifier LB3_3, and the lower right is the fourth quadrant tooth-region identifier LB3_4). The IMU motion deep learning model IM outputs the quadrant probability value UR of the first quadrant, the quadrant probability value UL of the second quadrant, the quadrant probability value LL of the third quadrant, and the quadrant probability value LR of the fourth quadrant.

In an embodiment, the quadrant probability value UR output by the IMU motion deep learning model IM is, for example, 90%, the quadrant probability value UR is, for example, 30%, the quadrant probability value UL is, for example, 10%, and the quadrant probability value LL is, for example, 20%. In this example, the quadrant probability value UR has the highest value among all quadrant probability values UR, UL, LL, and LR. It is represented that these tooth images have the highest probability of the tooth-region identifier LB3_1 (for example, the position of the tooth number 21 to 28) corresponding to the quadrant probability value UR.

In one embodiment, the IMU motion deep learning model IM is implemented by a recurrent neural network (RNN) model.

Figure 8:
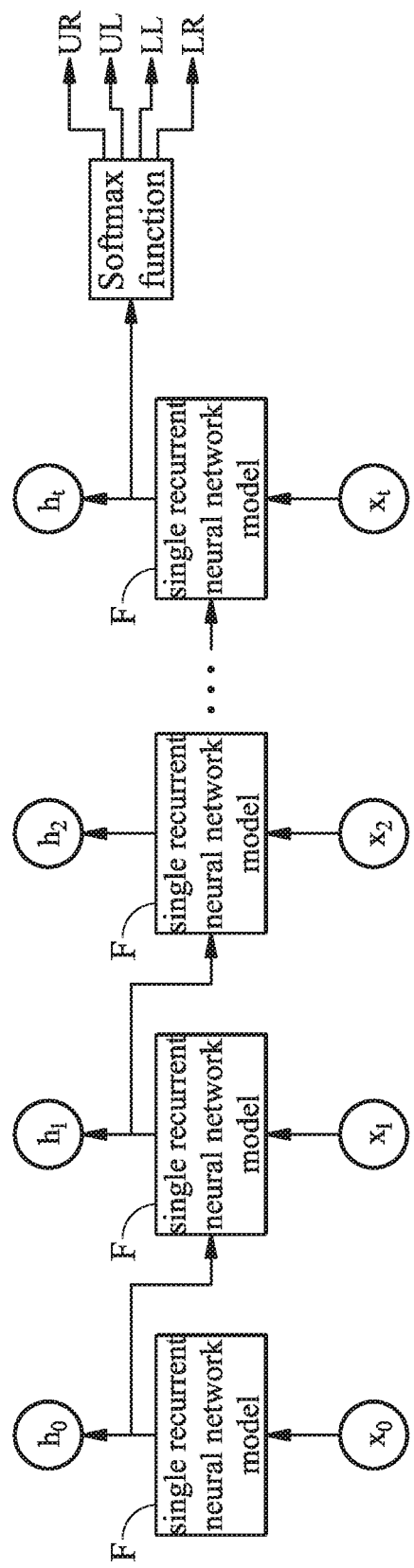
FIG. 8 is a schematic diagram of a recurrent neural network model in accordance with one embodiment of the present disclosure.

Please refer to FIG. 8, which is a schematic diagram of a recurrent neural network model in accordance with one embodiment of the present disclosure. Recurrent neural network models are often used for time series-related classifications (such as IMU motion classification), and time series data measured by IMU is input into the recurrent neural network model and classified. FIG. 8 is an example of a simple recurrent neural network (simple RNN) classification: symbol F represents a single recurrent neural network model, the input symbols x0-xt are IMU data of time 0-$t$ (e.g., the data measured by inertial measurement unit 114), and the symbol h0~ht is the hidden state of time 0-$t$, which will become the input of the next recurrent neural network. In other words, the recurrent neural network aims to create a memorized data, that is, to not forget the results of the previous output, accumulate it into a hidden state, and combine the hidden state with a current input together to produce an updated result, and pass the updated result on further. Therefore, the recurrent neural network is suitable for receiving sequences as inputting and outputting sequences, and providing a concise model for sequence generation. The last hidden state enters the Softmax function to transfer into a probability, so as to classify the results (for example, the quadrant probability values UR, UL, LL, and LR). In one embodiment, the recurrent neural network inputs a plurality of sets of classified IMU data during the training phase to update parameters in the recurrent neural network model and store the optimal parameters as the optimal recurrent neural network model.

There are quite a few recursive neural network models. In practice, it is possible to use a recurrent neural network architecture such as a simple cyclic neural network and a Long Short Term Memory Network (LSTM).

Figure 9:
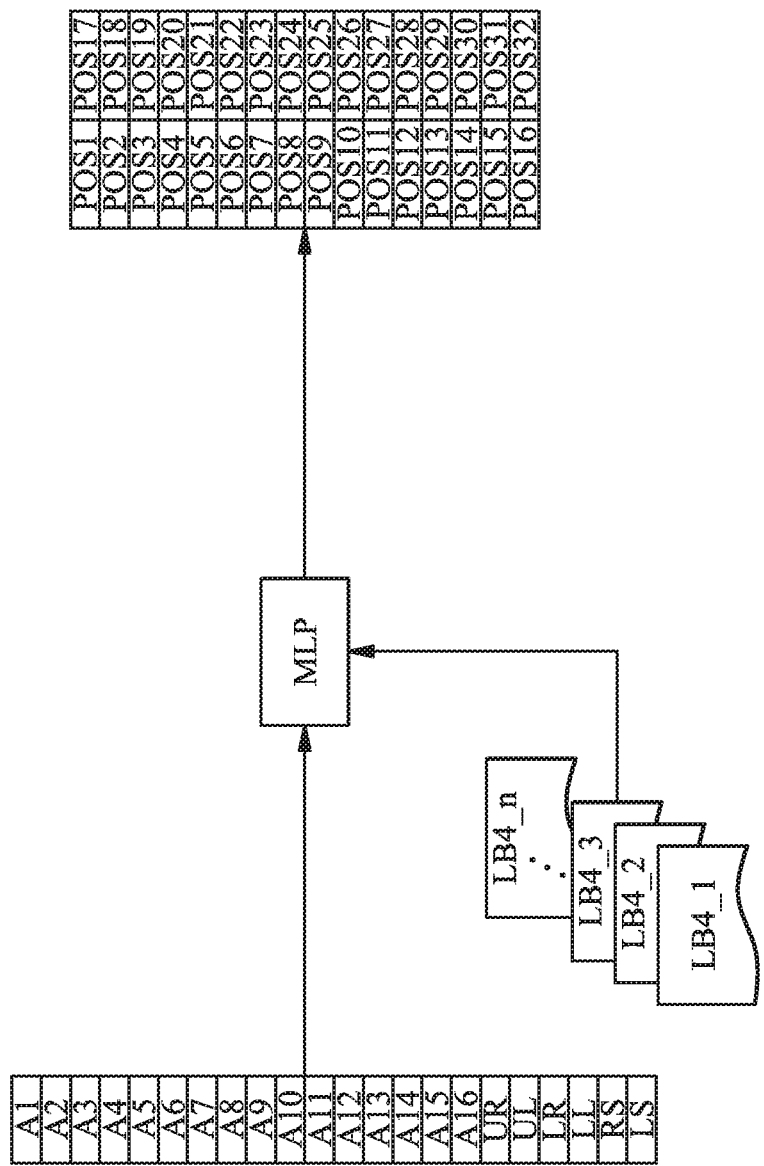
FIG. 9 is a schematic diagram of an application of a multi-layer perceptron to estimate the tooth position probabilities corresponding to the tooth images in accordance with one embodiment of the present disclosure.

Please refer to FIG. 9, which is a schematic diagram of an application of a multi-layer perceptron MLP to estimate the tooth position probabilities POS1 to POS32 corresponding to the tooth images in accordance with one embodiment of the present disclosure.

In step 260, the processor 122 treats the deep-learning probability values A1 to A16, the left regional probability value LS, and the right regional probability value RS as a plurality of feature values, and inputs the feature values and a plurality of tooth-region identifiers LB4_1-LB4_$n$ into a multi-layer perceptron classifier MLP, and the multi-layer perceptron classifier MLP outputs a tooth-position probability (e.g., at least one POS1-POS32) corresponding to the tooth images.

In one embodiment, the plurality of tooth-region identifiers LB4_1~LB4_$n$ are, for example, divided into 32 regions according to the position of 32 tooth (in this example, n is 32). The processor 122 regards the deep-learning probability values A1 to A16 (16 feature values), the left regional probability value LS, and the right regional probability value RS (2 feature values) as a plurality of feature values (a total of 18 feature values). The processor 122 inputs the feature values and the tooth-region identifiers LB4_1-LB4_$n$ (in this example, n is 32) into the multi-layer perceptron classifier MLP. The multi-layer perceptron classifier MLP outputs 32 tooth position probabilities POS1-POS32. It should be noted that in this example, the input is 18 feature values (the aforementioned quadrant probability values UR, UL, LL, and LR have not been input as feature values, so only 18 feature values are input). The number of feature values can be adjusted when the tooth's position recognition 100 is implemented in practice. In general, the more the number of input feature values, the more accurate the determining result of the tooth position probabilities POS1-POS32 output by the multi-layer perceptron classifier MLP.

In an embodiment, as shown in FIG. 9, the processor 122 regards the deep-learning probability values A1 to A16, the left regional probability value LS, the right regional probability value RS, and the quadrant probability values UR, UL, LL, and LR as feature values (there are a total of 22 feature values). The processor 122 inputs the feature values and the tooth-region identifiers LB4_1-LB4_n (in this example, n is 32) into the multi-layer perceptron classifier MLP. The multi-layer perceptron classifier MLP outputs a tooth position probabilities POS1-POS32 corresponding to the tooth images.

Figure 10:
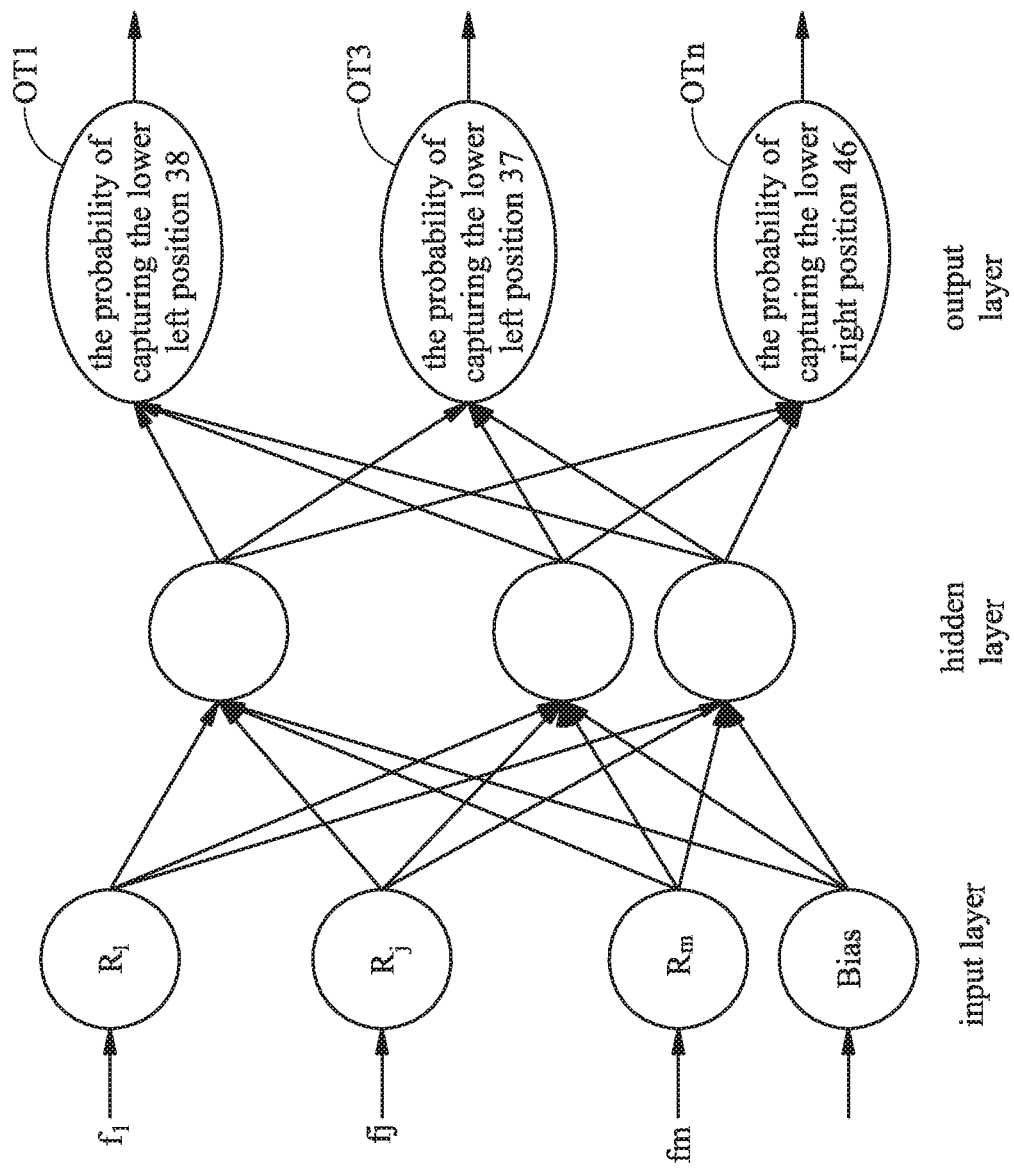
FIG. 10 is a schematic diagram of a method for identifying a dental region in accordance with one embodiment of the present disclosure.
Figure 11A:
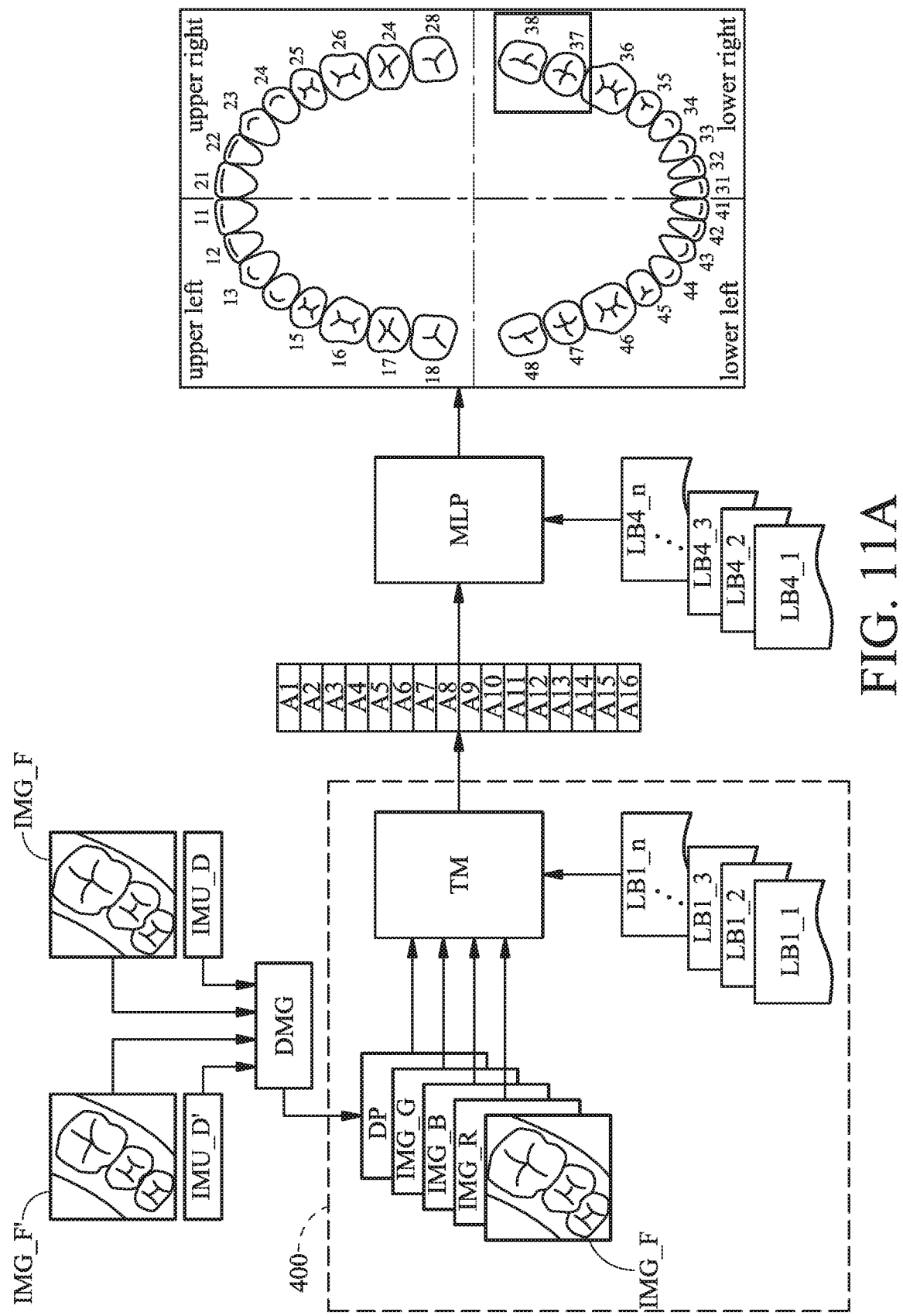
FIGS. 11A-11B are schematic diagrams of multi-layer perceptron classifier in accordance with one embodiment of the present disclosure.
Figure 11B:
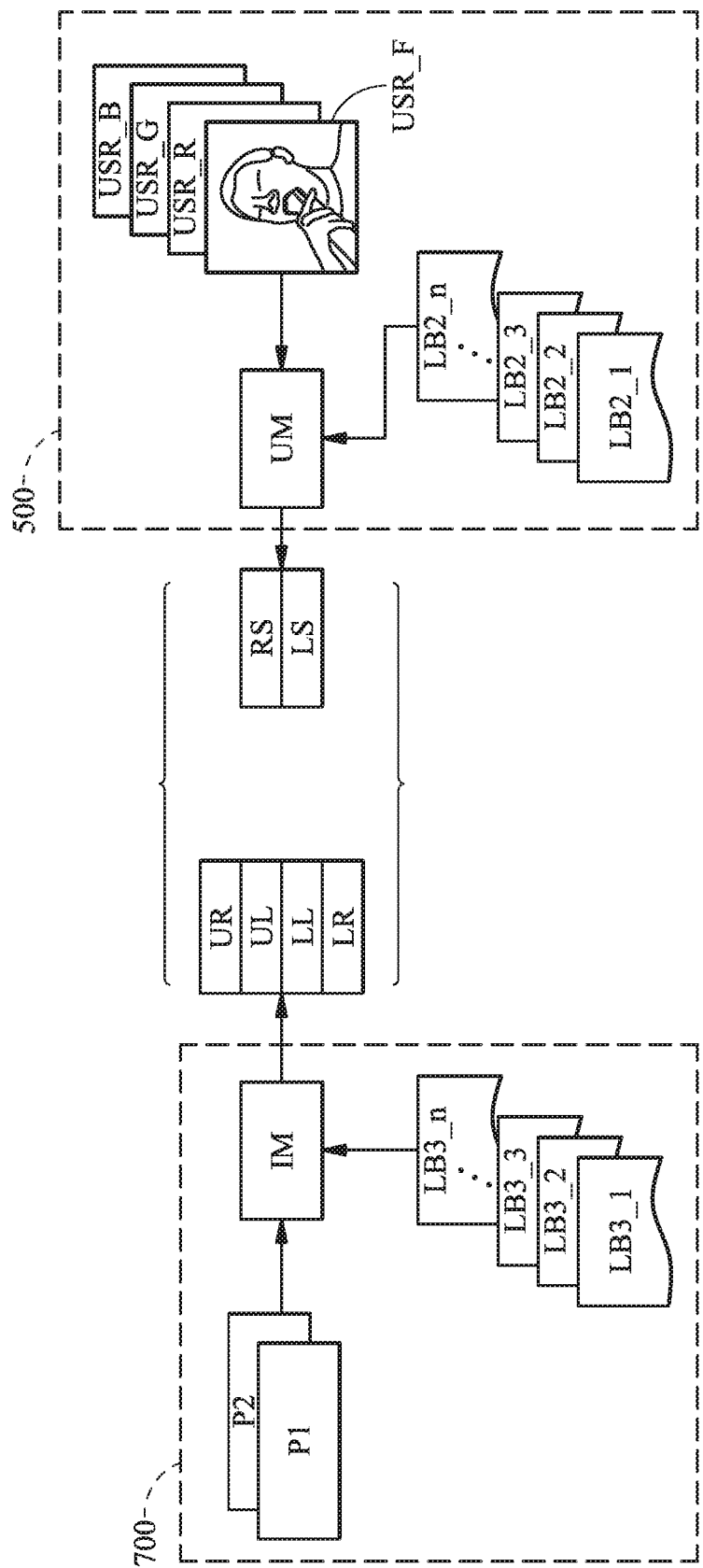

Please refer to FIGS. 10, 11A and 11B, FIG. 10 is a schematic diagram of a method for identifying a dental region in accordance with one embodiment of the present disclosure. FIGS. 11A and 11B are schematic diagrams of multi-layer perceptron classifier MLP in accordance with one embodiment of the present disclosure. In FIG. 10, the symbols f1~fm are the input features. The symbol Bias represents an offset configuration. The symbols R1~Rm can be regarded as a set of neurons, representing the input features after entering the multi-layer perceptron classifier MLP, which constitute an input layer. In some embodiments, the hidden layer can include multiple layers. Each neuron in the hidden layer will be the input of the current layer according to the output of the previous layer, and finally the results OT1-OTn are output. These results OT1-OTn constitute the output layer, and the output layer is the category of the desired classification. For example, the output layer outputs the results OT1, OT3, and OTn that are respectively the probability of capturing the lower left position 38 (for example, the tooth-position probability POS10 corresponding to the lower left position 38 is 90%), the probability of capturing the lower left position 37 (for example, the tooth-position probability POS10 corresponding to the lower left position 37 is 90%) . . . , and the probability of capturing the lower right position 46 (for example, the tooth-position probability POS21 corresponding to the lower right position 46 is 10%). If the probability 90% of the values in the output layer is the highest, the processor 122 determines that the tooth position corresponding to the input images are the lower left position 38 and the lower left position 37 in the tooth representation. However, persons with ordinary skill in the art will understand that the above is only an example, and the manner of output layer output is not limited thereto. The result of the operation can also be presented by other output parameters.

In one embodiment, a plurality of sets of classified feature data are input during the training stage to update parameters in the multi-layer perceptron classifier MLP, and the optimal parameters are stored as the best model.

In one embodiment, the implementation of the multi-layer perceptron classifier MLP can be applied by the software Scikit-learn. Scikit-learn is a free software machine learning library for the Python programming language. For example, the multi-layer perceptron classifier MLP can be applied by the sklearn.neural_network.MLPClassifier library of the software Scikit-learn.

In one embodiment, the camera 112 of the digital tooth mirror 110 is used to capture one or more tooth images. The inertial measurement unit 114 is configured to measure the posture information P1 and the motion track P2 of the digital tooth mirror 110. The processor 122 of the calculation device 120 is configured to receive one or more tooth images and compare the corresponding position of each pixel in each tooth image to generate a depth map DP. The processor 122 inputs the tooth images, the depth map DP, and the plurality of tooth-region identifiers LB1_1-LB1_n into a tooth deep-learning model TM. The tooth deep-learning model TM outputs a plurality of deep-learning probability values A1 to A16 that are the same in number as the tooth-region identifiers LB1_1-LB1_n. The processor 122 inputs the posture information P1, the motion track P2, and the plurality of tooth-region identifiers LB3_1~LB3_4 into an IMU motion deep learning model IM. The IMU motion deep learning model IM outputs a plurality of quadrant probability values UR, UL, LL, and/or LR, and regards these deep-learning probability values A1 to A16 and such quadrant probability values UR, UL, LL, and/or LR as feature values. The processor 122 inputs the feature values and the plurality of tooth-region identifiers LB4_1~LB4_n into the multi-layer perceptron classifier MLP. Moreover, the multi-layer perceptron classifier MLP outputs a tooth-position probability corresponding to the tooth images.

In an embodiment, in the FIGS. 11A-11B, the camera 112 of the digital dental mirror 110 sequentially captures the original image IMG_F and the original image IMG_F'. The inertial measurement unit 114 of the digital dental mirror 110 obtains the movement information IMU_D at the moment when the original image IMG_F is captured, and obtains the movement information IMU_D' when the original image IMG_F' is captured. The processor 122 receives the information and inputs the original image IMG_F, the original image IMG_F', the mobile information IMU_D, and the mobile information IMU_D' into the depth map generator DMG to generate a depth map DP. The depth map generator DMG can be implemented by the known technology. For example, a single-view image, a dual-view image, etc. are applied, and the depth map generator DMG is implemented by a hardware circuit or a software, so it will not be described here.

As can be seen from FIGS. 11A-11B, method 400 can optionally be combined with method 700 and/or method 500 to generate a plurality of feature values.

For example, the processor 122 executes the method 400 (FIG. 11A) will generate multiple deep-learning probability values (e.g., A1 to A16). The processor 122 executes the method 700 (FIG. 11B) to generate the quadrant probability values UR, UL, LL, and LR. Moreover, the processor 122 performs the method 400 with method 700 to generate 20 feature values. The processor 122 substitutes the 20 feature values into the multi-layer perceptron classifier MLP to estimate the probability of the tooth position corresponding to the tooth image. For example, the output layer output: the probability of capturing the lower left position 38 (for example, the tooth-position probability POS10 corresponding to the lower left position 38 is 80%), the probability of capturing the lower left position 37 (for example, the tooth-position probability POS11 corresponding to the lower left position 37 is 80%) . . . , and the probability of capturing the lower right position 46 (for example, the tooth-position probability POS21 corresponding to the lower right position 46 is 30%). If the probability 80% of the values in the output layer is the highest, the processor 122 determines that the tooth position corresponding to the input images are the lower left position 38 and the lower left position 37 in the tooth representation.

For example, the processor 122 executes the method 400 (FIG. 11A) will generate multiple deep-learning probability values (e.g., A1 to A16). The processor 122 executes the method 500 (FIG. 11B) to generate the left region probability value LS and the right area probability value RS. Moreover, the processor 122 performs the method 400 with method 500 to generate 18 feature values. The processor 122 substitutes the 18 feature values into the multi-layer perceptron classifier MLP to estimate the probability of the tooth position corresponding to the tooth image. For example, the output layer output: the probability of capturing the lower left position 38 (for example, the tooth-position probability POS10 corresponding to the lower left position 38 is 70%), the probability of capturing the lower left position 37 (for example, the tooth-position probability POS11 corresponding to the lower left position 37 is 70%) . . . , and the probability of capturing the lower right position 46 (for example, the tooth-position probability POS21 corresponding to the lower right position 46 is 40%). If the probability 70% of the values in the output layer is the highest, the processor 122 determines that the tooth position corresponding to the input images are the lower left position 38 and the lower left position 37 in the tooth representation.

For example, the processor 122 executes the method 400 (FIG. 11A) will generate multiple deep-learning probability values (e.g., A1 to A16). The processor 122 executes the method 700 (FIG. 11B) to generate the quadrant probability values UR, UL, LL, and LR. The processor 122 executes the method 500 (FIG. 11B) to generate the left region probability value LS and the right area probability value RS. Moreover, the processor 122 performs the method 400 with method 500 and method 700 to generate 22 feature values. The processor 122 substitutes the 22 feature values into the multi-layer perceptron classifier MLP to estimate the probability of the tooth position corresponding to the tooth image. For example, the output layer output: the probability of capturing the lower left position 38 (for example, the tooth-position probability POS10 corresponding to the lower left position 38 is 95%), the probability of capturing the lower left position 37 (for example, the tooth-position probability POS11 corresponding to the lower left position 37 is 95%) . . . , and the probability of capturing the lower right position 46 (for example, the tooth-position probability POS21 corresponding to the lower right position 46 is 10%). If the probability 95% of the values in the output layer is the highest, the processor 122 determines that the tooth position corresponding to the input images are the lower left position 38 and the lower left position 37 in the tooth representation.

The tooth-position recognition system applies tooth-region identifiers and a tooth deep-learning model to achieve the effect of automatically and accurately determining the tooth image corresponding to the actual tooth position.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A tooth-position recognition system, comprising:
an electronic device, comprising:
a first camera, configured to capture a plurality of tooth images; and
a calculation device, comprising:
a second camera, configured to capture a user image; and
a processor, configured to receive the tooth images, compare a corresponding position of each pixel in each tooth image to generate a depth map, input the tooth images, the depth map, and a plurality of first tooth-region identifiers into a tooth deep-learning model; wherein the tooth deep-learning model outputs a plurality of deep-learning probability values that are the same in number as the first tooth-region identifiers; wherein the processor inputs the user image and the plurality of second tooth-region identifiers into a user-image deep-learning model, the user-image deep-learning model outputs a left region probability value and a right region probability value; wherein the processor treats the deep-learning probability values, the left regional probability value, and the right regional probability value as a plurality of feature values, and inputs the feature values and a plurality of third tooth-region identifiers into a multi-layer perceptron classifier, and the multi-layer perceptron classifier outputs a tooth-position probability corresponding to the tooth images.

2. The tooth-position recognition system of claim 1, further comprising:
an inertial measurement unit (IMU), configured to measure posture information and motion track of the electronic device;
wherein the processor inputs the posture information, the motion track and a plurality of fourth tooth-region identifiers into an IMU-movement deep-learning model, and the IMU-movement deep-learning model outputs a plurality of quadrant probability values.

3. The tooth-position recognition system of claim 2, wherein the processor treats the deep-learning probability values, the left regional probability value, the right regional probability value, and the quadrant probability values as feature values, and inputs the feature values and the third tooth-region identifiers into a multi-layer perceptron classifier, and the multi-layer perceptron classifier outputs a tooth-position probability corresponding to the tooth images.

4. The tooth-position recognition system of claim 1, wherein the tooth images include an R channel array image, a G channel array image, and a B channel array image.

5. The tooth-position recognition system of claim 2, wherein the tooth deep-learning model and the user-image deep-learning model are each implemented by a convolutional neural network (CNN) model, and the IMU motion deep learning model is implemented by a recurrent neural network (RNN) model.

6. A tooth-position recognition system, comprising:
an electronic device, comprising:
a first camera, configured to capture a plurality of tooth images; and
an inertial measurement unit (IMU), configured to measure the posture information and the motion track of the electronic device; and
a calculation device, comprising:
a processor, configured to receive the tooth images, compare the corresponding position of each pixel in each tooth image to generate a depth map, input the tooth images, the depth map, and a plurality of first tooth-region identifiers into a tooth deep-learning model; wherein the tooth deep-learning model outputs a plurality of deep-learning probability values that are the same in number as the first tooth-region identifiers; wherein the processor inputs the user image and the plurality of second tooth-region identifiers into an IMU-movement deep-learning model, and the IMU-movement deep-learning model outputs a plurality of quadrant probability values; wherein the processor treats the deep-learning probability values and the quadrant probability values as feature values, and inputs the feature values and a plurality third tooth-region identifiers into the multi-layer perceptron classifier, and the multi-layer perceptron classifier outputs a tooth-position probability corresponding to the tooth images.

7. The tooth-position recognition system of claim 6, which further comprises:
   a second camera, configured to capture a user image;
   wherein the processor inputs the user image and a plurality of fourth tooth-region identifiers into a user-image deep-learning model, the user-image deep-learning model outputs a left region probability value and a right region probability value.

8. The tooth-position recognition system of claim 7, wherein the processor treats the deep-learning probability values, the left regional probability value and the right regional probability value as feature values, and inputs the feature values and the third tooth-region identifiers into the multi-layer perceptron classifier, and the multi-layer perceptron classifier outputs a tooth-position probability corresponding to the tooth images.

9. The tooth-position recognition system of claim 8, wherein the tooth images include an R channel array image, a G channel array image, and a B channel array image.

10. The tooth-position recognition system of claim 7, wherein the tooth deep-learning model and the user-image deep-learning model are each implemented by a convolutional neural network (CNN) model, and the IMU motion deep learning model is implemented by a recurrent neural network (RNN) model.

* * * * *